United States Patent
Rakshit

(10) Patent No.: US 10,775,740 B2
(45) Date of Patent: Sep. 15, 2020

(54) HOLOGRAPHIC PROJECTION OF DIGITAL OBJECTS IN VIDEO CONTENT

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 567 days.

(21) Appl. No.: 15/413,520

(22) Filed: Jan. 24, 2017

(65) Prior Publication Data

US 2018/0213194 A1 Jul. 26, 2018

(51) Int. Cl.
*H04N 7/18* (2006.01)
*G03H 1/22* (2006.01)
*H04N 13/302* (2018.01)

(52) U.S. Cl.
CPC ......... *G03H 1/2249* (2013.01); *H04N 13/302* (2018.05); *G03H 2001/2255* (2013.01); *G03H 2001/2284* (2013.01); *G03H 2210/44* (2013.01); *G03H 2210/62* (2013.01)

(58) Field of Classification Search
CPC .................................................. H04N 9/3179
USPC .......................................................... 348/49
See application file for complete search history.

(56) References Cited

U.S. PATENT DOCUMENTS

| | | | | |
|---|---|---|---|---|
| 6,476,850 B1 * | 11/2002 | Erbey | ................ | H04N 13/0239 345/6 |
| 8,500,284 B2 * | 8/2013 | Rotschild | ........... | G02B 27/2271 353/10 |
| 8,847,919 B2 | 9/2014 | Krah | | |
| 2008/0204834 A1 * | 8/2008 | Hill | ...................... | G03H 1/2294 359/9 |
| 2011/0205101 A1 * | 8/2011 | Mardirossian | .......... | F41H 11/02 342/14 |
| 2012/0170089 A1 * | 7/2012 | Kim | ....................... | G06F 3/011 359/9 |
| 2014/0160145 A1 * | 6/2014 | Kim | .................... | G03H 1/2294 345/589 |
| 2015/0146269 A1 | 5/2015 | Lee et al. | | |
| 2015/0309571 A1 * | 10/2015 | Cheng | .................... | G06F 3/013 345/419 |
| 2015/0325042 A1 | 11/2015 | Weichselbaum | | |

(Continued)

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Leron Beck
(74) *Attorney, Agent, or Firm* — Michael O'Keefe; Matthew M. Hulihan; Heslin Rothenberg Farley & Mesiti PC

(57) ABSTRACT

Holographic projection of a digital object. A method includes identifying movement of a digital object in video content. The movement is along a path across a plurality of video frames of the video content. The method presents the video content on at least one display device. The presenting includes projecting a three-dimensional holographic image of the digital object adjacent to a surface of the display. The projecting traces the holographic image along the path across the plurality of video frames.

17 Claims, 11 Drawing Sheets

(56) References Cited

U.S. PATENT DOCUMENTS

| | | | | |
|---|---|---|---|---|
| 2016/0313963 | A1* | 10/2016 | Kang | G06F 3/011 |
| 2017/0201740 | A1* | 7/2017 | Gordon | G06F 3/1423 |
| 2018/0032127 | A1* | 2/2018 | Adhia | G05B 19/056 |
| 2018/0120766 | A1* | 5/2018 | Kline | G03H 1/0005 |

OTHER PUBLICATIONS

Michio, Kaku, "Advances in Holographic Technology Could Have Far-Reaching Implications", [retrieved on Nov. 22, 2016]. Retrieved from the Internet: < URL: http://bigthink.com/dr-kakus-universe/advances-in-holographic-technology-could-have-far-reaching-implications>, undated, 12 pgs.

Various articles/authors, [retrieved on Nov. 22, 2016]. Retrieved from the Internet: < URL: http://holo-tv.com/>, 11 pgs.

Smith, John, "3D Hologram and the Future of Technology and Entertainment", [retrieved on Nov. 22, 2016]. Retrieved from the Internet: <URL: http://www.business2community.com/tech-gadgets/3d-hologram-future-technology-entertainment-01214803#ykKSwxV03S0QRYQy.97>, Apr. 29, 2015, 6 pgs.

Rossignol, Joe, "Apple granted patent for interactive holographic display device", [retrieved on Nov. 22, 2016]. Retrieved from the Internet: <URL: http://www.iphonehacks.com/2014/09/apple-patent-interactive-holographic-display-device.html>, Sep. 30, 2014, 6 pgs.

Cervantes, Edgar, "Samsung files patent for smartphone that can display holographic images", [retrieved on Nov. 22, 2016]. Retrieved from the Internet: <URL: http://www.androidauthority.com/samsung-patent-smartphone-holographic-images-633167/>, Aug. 11, 2015, 5 pgs.

Russon, Mary-Ann, "Touchable 3D holograms in daylight now possible using superfast femtosecond lasers", [retrieved on Nov. 22, 2016]. Retrieved from the Internet: < URL: http://www.ibtimes.co.uk/touchable-3d-holograms-daylight-now-possible-using-superfast-femtosecond-lasers-1508599>, Jun. 30, 2015, 3 pgs.

Edwards, Luke, "Holograms are finally here: Plasma lasers used to create images in mid-air", [retrieved on Nov. 22, 2016]. Retrieved from the Internet: <URL: http://www.pocket-lint.com/news/131622-holograms-are-finally-here-plasma-lasers-used-to-create-images-in-mid-air>, Nov. 5, 2014, 6 pgs.

Kujawinska, M., "Holographic capturing and rendering systems, suitable holographic data representations", [retrieved on Nov. 22, 2016]. Retrieved from the Internet: < URL: https://jpeg.org/downloads/plenoworkshop/9-Kujawinska%20-%20Holographic%20Capturing%20and%20Rendering%20Systems.pdf>, JPEG PLENO Workshop, undated, 26 pgs.

Orzo, László, "Advanced background elimination in digital holographic microscopy", [retrieved on Nov. 22, 2016]. Retrieved from the Internet: < URL: http://ieeexplore.ieee.org/xpl/login.jsp?tp=&arnumber=6331441&url=http%3A%2F%2Fieeexplore.ieee.org%2Fxpls%2Fabs_all.jsp%3Farnumber%3D6331441>, Aug. 29-31, 2012, 3 pgs.

"Perfectly Clear—Award-Winning Image Correction for Desktop and Mobile Devices" [retrieved from the Internet Dec. 13, 2016]. Retrieved from the Internet: < URL:http://www.athentech.com/ >, 3 pgs.

"Viesus—Automatic Image Correction for Perfect and More Vivid Moments" [retrieved from the Internet Dec. 13, 2016]. Retrieved from the Internet: < URL:http://www.viesus.com/ >, 4 pgs.

"PhotoCleaner—enhance digital photos: levels, contrast and color correction, resize, sharpen, crop, red eye, add frame and title to multiple images" [retrieved from the Internet Dec. 13, 2016]. Retrieved from the Internet: < URL:http://www.photocleaner.com/>, 2 pgs.

* cited by examiner

HOLOGRAPHIC PROJECTION OF DIGITAL OBJECTS IN VIDEO CONTENT

BACKGROUND

Per developments in holography, three-dimensional holographic objects can be created or 'projected' in mid-air to give the impression of a floating object. One or more such objects can be created such that they are set-apart from a display surface, such as the display of a mobile device. Additionally, users can perform various interactions with the created holographic object, for instance to 'touch' or spin the holographic object. However, there are unaddressed opportunities to leverage holographic technology to enhance entertainment experiences.

SUMMARY

Shortcomings of the prior art are overcome and additional advantages are provided through the provision of a computer-implemented method. The method identifies movement of a digital object in video content. The movement is along a path across a plurality of video frames of the video content. The method presents the video content on at least one display device. The presenting includes projecting a three-dimensional holographic image of the digital object adjacent to a surface of the display. The projecting traces the holographic image along the path across the plurality of video frames.

Further, a computer system is provided that includes a memory and a processor in communications with the memory. The computer system is configured to perform a method. The method identifies movement of a digital object in video content. The movement is along a path across a plurality of video frames of the video content. The method presents the video content on at least one display device. The presenting includes projecting a three-dimensional holographic image of the digital object adjacent to a surface of the display. The projecting traces the holographic image along the path across the plurality of video frames.

Yet further, a computer program product including a computer readable storage medium readable by a processor and storing instructions for execution by the processor is provided for performing a method. The method identifies movement of a digital object in video content. The movement is along a path across a plurality of video frames of the video content. The method presents the video content on at least one display device. The presenting includes projecting a three-dimensional holographic image of the digital object adjacent to a surface of the display. The projecting traces the holographic image along the path across the plurality of video frames.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
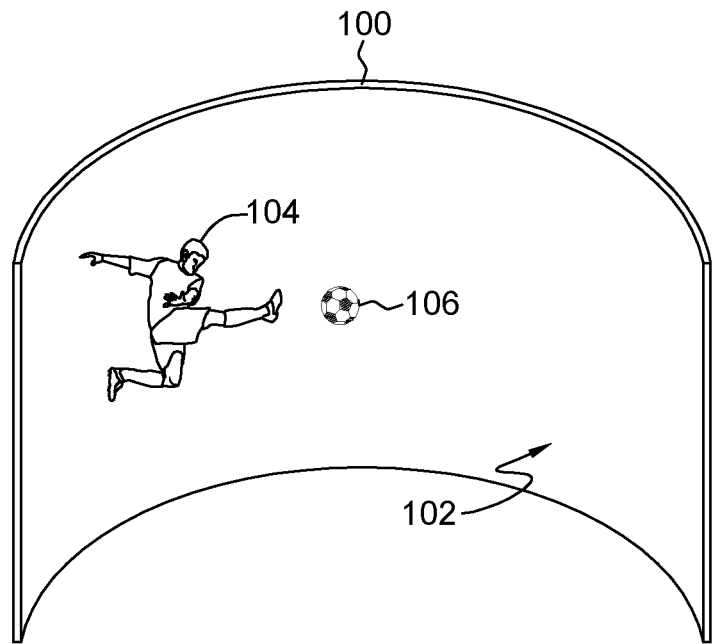
FIGS. 1A-2B collectively depict on a display device movement of digital objects in video content across a plurality of video frames and an example holographic projection of one such object, in accordance with aspects described herein.

Viewers of digital content may desire enhanced entertainment experiences, for instance more interactivity when viewing video content presented thereon. Example interaction can be in the visualization of the movement of a digital object of the video content between portions of a display device and/or between portions of multiple different display devices, for instance tracking a digital object from one display device to another. This creates visual appeal while watching video content such as television shows, movies, or any other video content.

Described herein are facilities for establishing a holographic image of a digital object and tracking its movement between portions of a display device and/or between portions of multiple different display devices. 'Display device' refers to any device capable of displaying digital images, and includes televisions, monitors, and mobile device displays, as examples, as well as physical surfaces onto which images maybe projected, such as projector screens.

Holographic projection device(s) can project the holographic image at or adjacent to the surface of the display device(s) and move the holographic image above the display device(s) over where the digital object moves in a scene that extends across multiple video frames. There can be various applications of this technology to represent certain digital objects holographically floating above the display device(s), for instance when presenting movies having vast landscapes or space-related themes, when presenting lighting effects from a lighting system aligned to musical content, or when highlighting digital objects within educational content, as examples.

As a specific example, the video content may include digital object(s) representing streaming light, for example in a music video in which a dancer dances in a relatively dark room into which a narrow stream of light enters in the background. A holographic projection of the streaming light enhances the visual effect of the light. As another example, a digital object may be a glowing object, such as a long piece of equipment being held by an actor in the digital content. A three-dimensional depiction of the object being waved around enhances the experience for the viewers and adds a realistic element to the scene. Aspects described herein can create and project a holographic image of these digital objects above the display device(s) and move the holographic image around above the display device(s) to track the movement of the underlying digital object in the scene. The movement of the digital object is taken across several video frames, since each video frame is a static digital image.

The viewer viewing the video content with the holographic image projected adjacent to the display device over a surface thereof would see the holographic image imposed over the video content showing on the underlying display device. In other words, the holographic image may be projected just in front of the display panel, in the viewer's line of sight to the display panel and therefore to the video content playing on the display device. Since the digital objects may be effectively copied, in three-dimensions, above the display surface, the digital objects in the video frames as two-dimensional objects may optionally be removed and replaced with other content, such as content representing what is 'behind' the digital objects in the scene being depicted in the video content.

Accordingly, in an example process, based on video analysis and/or a user's visual feedback (indication to a system as to what the user is viewing), software installed in a computer system, such as a display device or system coupled thereto, or remote server, can identify appropriate moving object(s) that may create visual appeal to the viewer. For example, in a football game, the football or ball carrier may be the center of viewer attention much of the time. Video content showing a football game presents an opportunity to create a holographic image of the football in some portion(s) of the video content, which may be a streaming live version of the football match or a pre-recorded and stored version.

Holographic projectors can be installed in, on, or proximate the display device(s) displaying the video content. In one embodiment, holographic projectors are installed in/along multiple edges of a display device. The holographic projectors can receive input from, e.g., video analysis software that ascertains relative position and direction of movement of the digital object and corresponding positions of the digital object in the video frames. Accordingly, one or more of the holographic projectors can create a holographic object/image of the digital object in the video content, and project this holographic image along with the display of the video content in the display screen. The holographic projection device(s) can project the holographic image and move it from one portion of the display to another portion of the display and/or one display device to another display device when the content is shown on multiple adjacent displays. In this latter regard, when there are multiple digital displays adjacent to each other, the system can track the holographic image from one display to another display, traversing the boundary of the two displays.

When a digital object is identified for holographic projection and if the digital object is to be removed from video frames, for instance because a holographic image of the object is instead to be presented in accordance with aspects described herein, software can identify the 'gap', left by the removal, in each of the affected video frames. These gaps can then be filled in to show any desired replacement content, such as background content representing what is in the background in the scene. The replacement content may be taken from one or more other video content, such as other video feeds. For instance, the scene may be shot from different angles so that what is in the background of the digital object from the vantage point delivered to the user across the affected video frames is captured by another video camera and used to fill in the gaps left in the video frames when removing the digital object therefrom. Additionally or alternatively, video frame analysis may be performed on the video frames and image correction applied to extrapolate the replacement digital content for insertion. This filling-in of the gaps provided by removing the digital content from the frames may be performed manually or automatically, or a combination of the two.

FIGS. 1A-2B collectively depict on a display device movement of digital objects in video content across a plurality of video frames and an example holographic projection of one such object, in accordance with aspects described herein. Referring first to FIG. 1A, a display device 100 (having a curved display panel in this example) is shown. The display device displays a video frame depicting a soccer player 104 striking a ball 106. 102 is the surface of the display device 100.

Figure 2A:
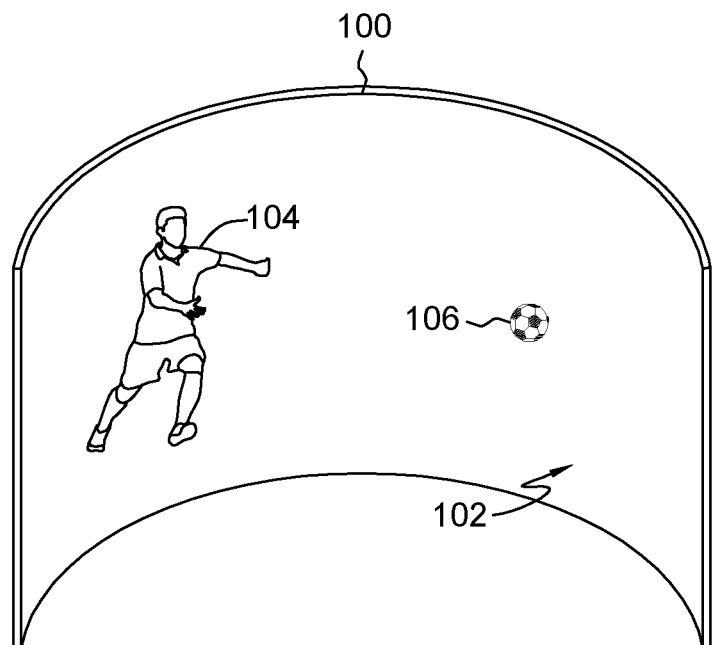

FIG. 2A depicts display device 100 displaying a video frame that is several frames later in the video content. It is seen that both the soccer player 104 and ball 106 have moved. The soccer player 104 has shifted position as part of his follow-through of the kick and the ball has traveled a distance from its previous position. In most video content having a typical framerate, the video content would include several video frames between the ones depicted in FIGS. 1A and 2A.

It is also noted that movement occurs in the digital object (representing ball 106) and the movement is along a path across a plurality of frames. By "across" the plurality of frames is meant that the movement or repositioning of the digital object (i.e. the ball) is conveyed via changes in the position of the digital object observed as between the plurality of frames, from one frame to the next, etc. That is, observing a sequence of frames and comparing position of a given object from frame to frame, the change in position indicates that the object is moving (or the camera has changed position), either one producing a change in the position of the digital object relative to the perimeter of the video frames and therefore the display device when the video content is shown thereon.

Figure 1B:
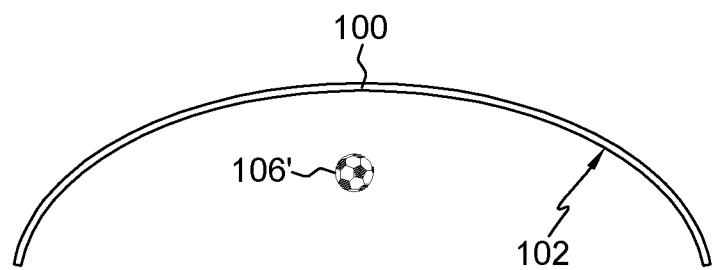
Figure 2B:
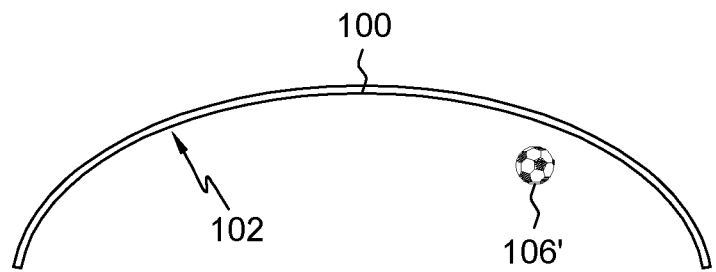

A holographic projector/projection device can project a three-dimensional holographic image of the digital object, and this can be projected adjacent to the surface 102 of the display device. FIG. 1B depicts a top view illustrating a holographic image of soccer ball 106, which in this example is denoted by 106'. It is seen that holographic image 106' is projected or created spaced apart from surface 102. In some examples, the object is projected to be in a range of ½ inch to 18 inches from the display device. In other examples, such as those involving a large movie theater screen as the display device, the distance between the display device and holographic image may be greater. Referring now to FIG. 2B corresponding to FIG. 2A showing a subsequent video frame, the holographic image 106' is in a different position— one that corresponds to the different position of ball 106 in FIG. 2A.

Just as the ball 106 has a trajectory that moves the ball along a path as between the frames in the sequence, the projection of the holographic image 106' can follow or trace that path across the sequence of frames. Viewing the video content looking head-on to the display as in the view of FIGS. 1A and 2A, the path of the ball extends generally from left to right. The projecting can therefore trace that path from left to right, hovering the holographic image over the ball 106 as it moves across the sequence of frames, i.e. as the sequence of frames are presented on the display. The projectors move the holographic image 106' from left to right, maintaining the holographic image spaced apart from the display surface, to maintain the holographic image projected over the image of the ball across the sequence of frames.

The holographic projectors can control the positioning of the holographic image, and therefore can control not only the movement of the holographic image in the horizontal and vertical directions but also the depth direction, e.g. how far from the display surface 102 the holographic image resides. Consequently, in some examples, the holographic projectors may instantiate the holographic image against or relatively close to the display surface. Then, as they trace the holographic image along the path of the underlying digital object in the x-y (horizontal-vertical) directions (facing the display device), they can control the y-direction (depth) at which the holographic image is positioned, which corresponds to the spacing between the holographic image and the display surface. The holographic image may therefore have a trajectory relative to the display surface that is controllable by holographic projectors.

Figure 3:
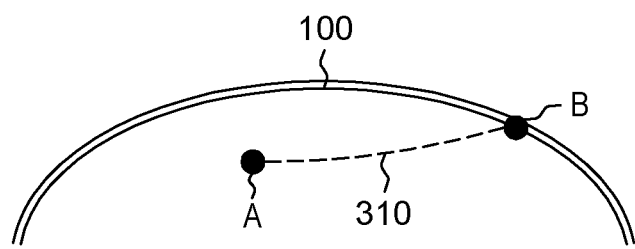
FIG. 3 depicts an example trajectory of a holographic image across a plurality of video frames in accordance with aspects described herein.

FIG. 3 depicts an example trajectory of a holographic image across a plurality of video frames in accordance with aspects described herein. FIG. 3 depicts a top view showing the trajectory 310 of the ball 106' from point A to point B. It is noted that as the holographic image follows its trajectory, it approaches the surface of the display device and completes its trajectory at the display surface. The visual effect may be that the holographic image which starts in front of the display device (relative to the viewer's direction) appears to vanish or merge into the surface of the display device, which may provide an appealing visual effect.

In another example, the digital object is an elongated stick being held by a person in the video content and the person holding the stick moves the stick around. In this case, the holographic image may be a three-dimensional image of the stick. The holographic image may be entirely spaced apart from the display surface, or may be oriented so that it extends outwardly away from a portion of the display surface, as if the stick pops out from the display device toward the viewer. In either case, the holographic projector(s) can move the holographic image commensurate with the movement of the stick in the video content, imparting a realistic three-dimensional aspect to the object being moved around by the person holding the stick. In the particular example of a curved display, the holographic image may extend from one portion of the display surface to another portion of the display surface.

The video content can be presented on the display along with the holographic image while the video content is played or viewed so that the viewer can visualize the holographic object in sync with the video content being played in the background of the holographic image (i.e. displayed on the display device).

The points at which to begin and end projecting the holographic image can vary, and may depend on the circumstances such as what the digital object is or the nature of its movement. In the examples of FIGS. 1A-3, the holographic image may be instantiated and projected beginning with the frame where the soccer player strikes the ball (e.g. just before the frame depicted in FIG. 1A). The projecting can terminate when the holographic image completes its trajectory to point B in FIG. 3.

Figure 4:
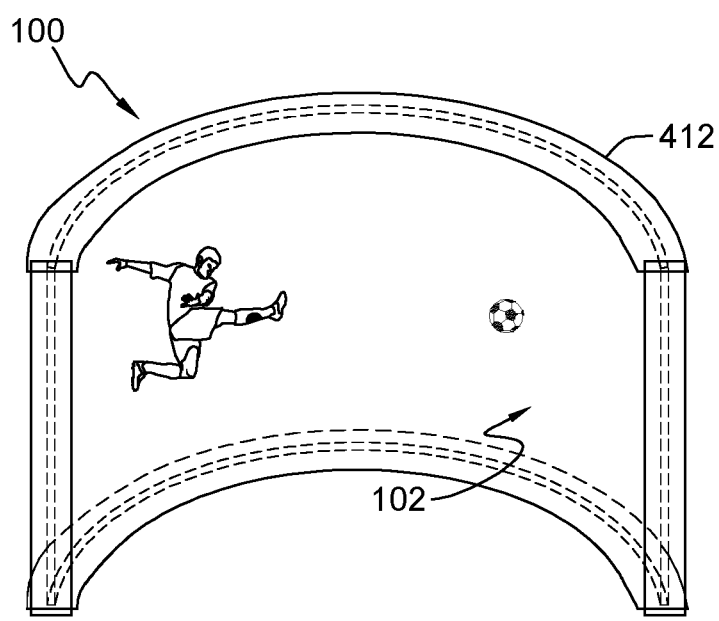
FIG. 4 depicts an example system having a display device and holographic projection device to incorporate or use aspects described herein.

FIG. 4 depicts an example system having a display device and holographic projection device(s) to incorporate or use aspects described herein. Multiple holographic projectors/projection devices 412 are to installed at/on the edge of display device 100. The projectors are configured to create/project three-dimensional object(s) near by the surface 102 of the display so that a viewer can visualize one or more digital object(s), of the video content, moving in the space in front of the display device 100 while watching the video content. The projectors can be fixed at predefined angles and may be movable, manually and/or automatically.

Though examples depicted include only a single display device or panel, aspects described herein apply to cases where there are two or more display devices/panels. In these situations, holographic projectors can be provided and configured to project holographic images adjacent any of the display surfaces. Additionally, since video content presented on multiple display devices spans the display devices, digital objects may move on/off an individual display device to an adjacent display device. The projection of the holographic images can track that movement so that the holographic images also trace across display device boundaries, meaning tracing a holographic image across a portion of a first display to a second display and across a portion of the second display.

Figure 5A:
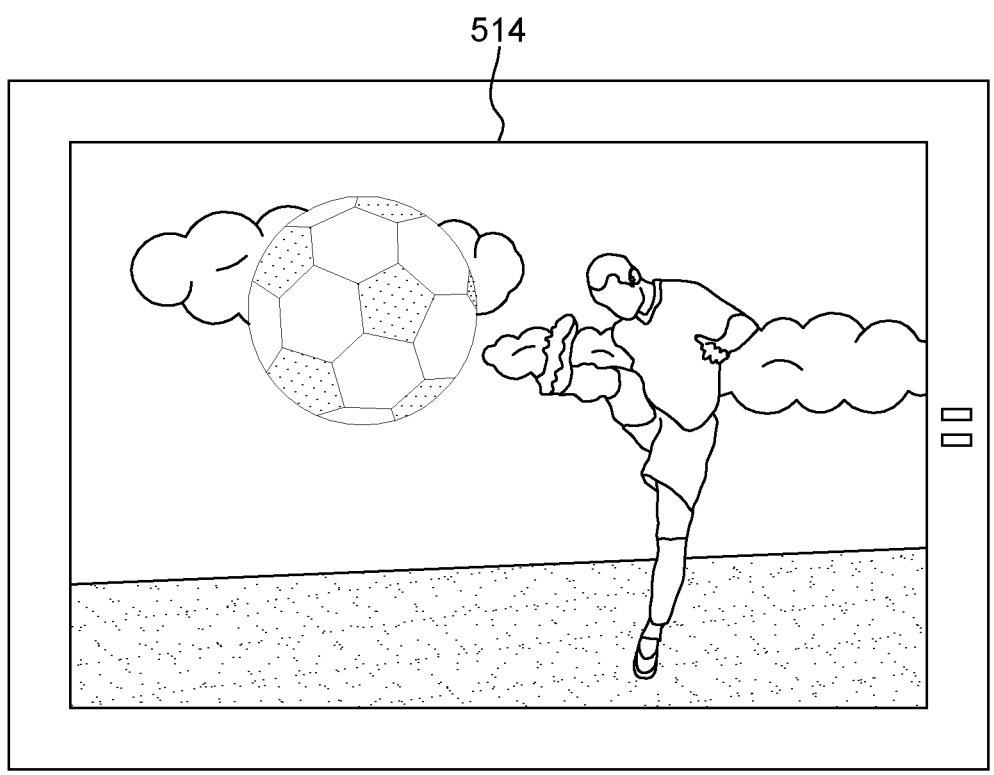
FIGS. 5A-5C collectively depict removal and replacement of digital object(s) from video frames in accordance with aspects described herein.
Figure 5B:
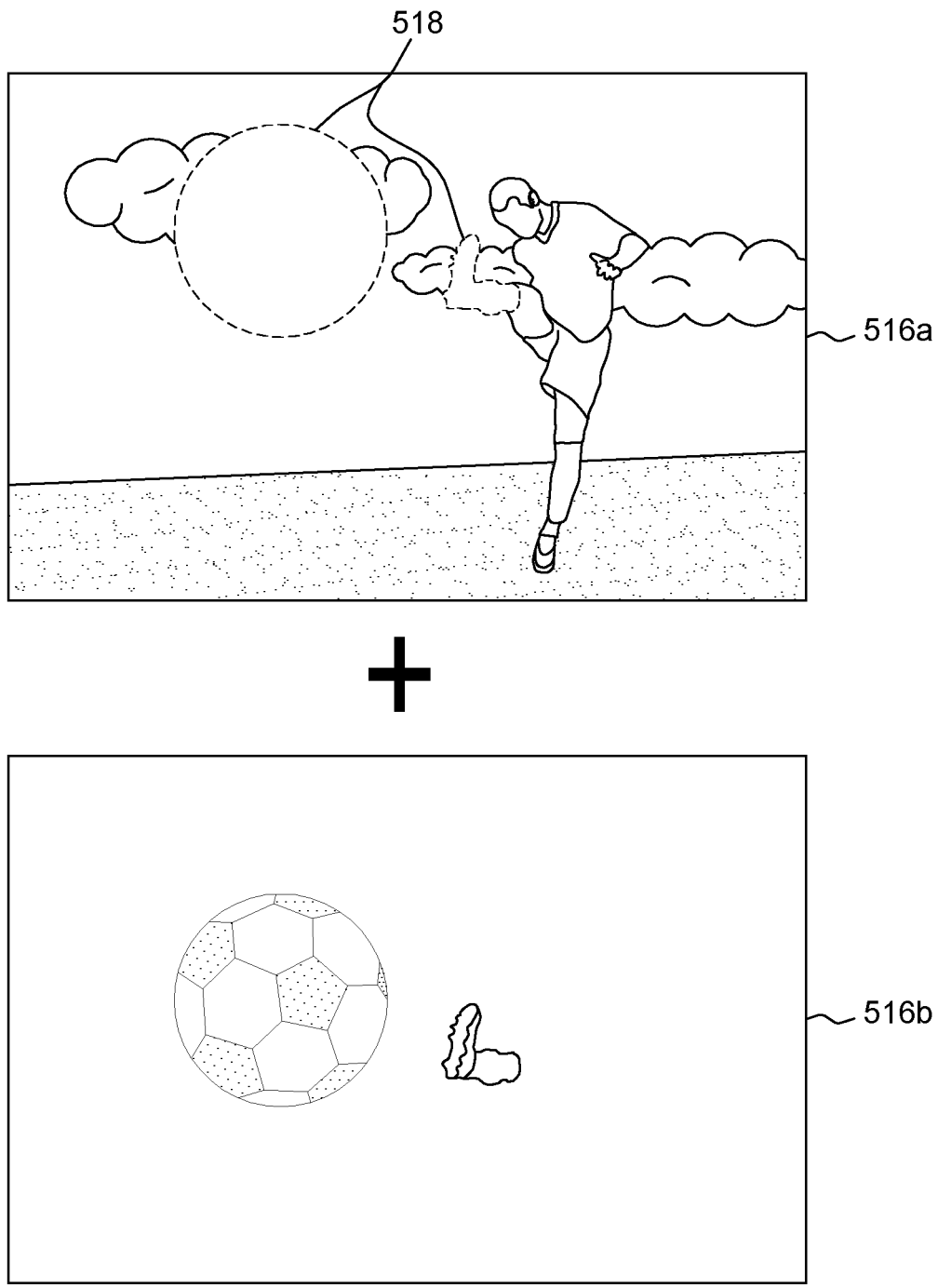
Figure 5C:
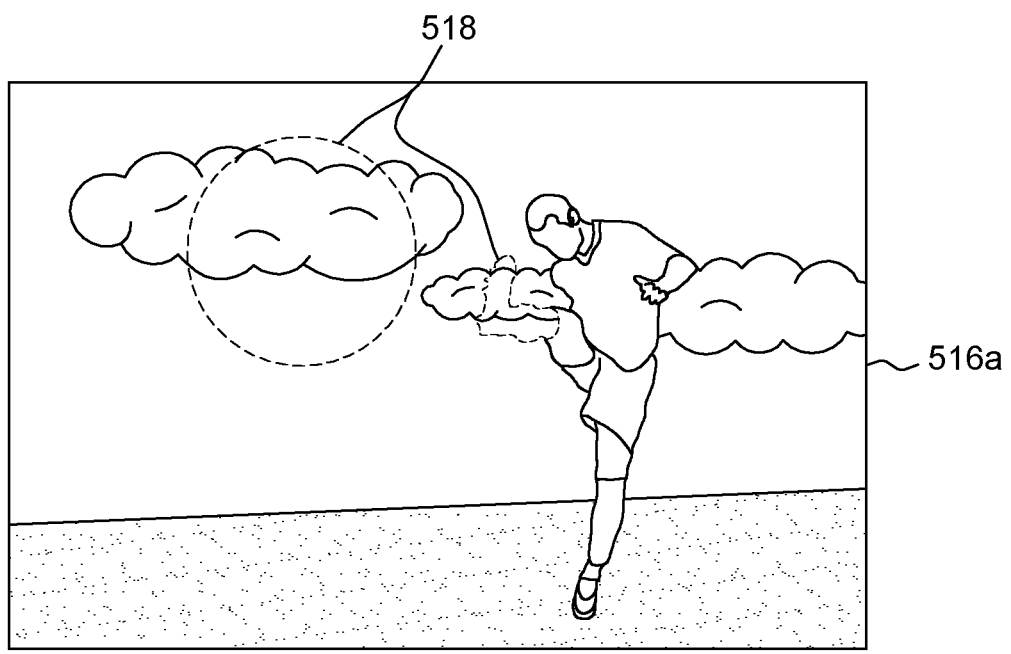

As an enhancement, the video content can be displayed as-is or optionally modified. That is, the video frames, of the video content, from which the digital object is extracted and made into a holographic image may be modified to remove therefrom the digital object or parts thereof. The portions of the frames where the digital object was removed may be replaced with other digital objects. FIGS. 5A-5C collectively depict removal and replacement of a digital object(s) from video frames in accordance with aspects described herein.

As an example, a video analysis tool can analyze video frames of a video file and identify/extract candidate digital objects for holographic projection. Software can also 'correct' the video frame with, e.g., an image correction method. The 'extracted' digital object information can be placed into a separate layer—a holographic layer—in the video file.

Referring initially to FIG. 5A, a source or original video frame 514 is shown (displayed on a tablet computer system in this example). The original video frame shows a soccer player having just kicked a ball generally toward the viewer's left side. FIG. 5B conceptually illustrates the extraction of digital objects 518 from the video frame 514 based on selecting those objects for holographic projection. Frame 514 is the combination of fragments 516a and 516b. 516a depicts the frame 514 with digital objects 518 (the soccer ball and the player's kicking foot) removed therefrom, resulting in 'gaps' in frame 514, outlined in dashes in FIG. 5B. 516b depicts the portions (digital objects) from frame 514 that have been extracted for holographic projection. The holographic projectors can project holographic images of the soccer ball and the player's kicking foot adjacent to the surface of the display device. It should be noted that the objects may be regarded as mere candidates for holographic projection, subject to a selection process to select which, if any, are to be actually removed from the video frame and presented holographically.

Meanwhile, image correction or other insertion of replacement digital content may be performed, as shown in FIG. 5C, to fill in the gaps left by removing any digital object(s) that were removed from the video frames for holographic projection. Here, image correction is applied to fill the gaps with background content that the viewer would see if the ball and players foot were removed. This background content is extrapolated from analyzing the video frames. In this example, the analysis would identify a continuation of the clouds in the background of the scene, and image correction applied to the fragment 516a to produce a modified version of frame 514. It would be this modified version of frame 514 (and modified versions of frames around 514 for the duration of the holographic projection of digital object) that is presented as the video content viewed by the viewer. One reason for replacing the digital object with replacement digital content may be that the holographic images appear at least partially transparent. The replacement digital content provides an underlying backdrop against which the holographic content may be viewed.

Fragment information, holography information describing the holographic image(s) and positioning thereof during video content playback, and/or any other information to facilitate aspects described herein may be stored in different layer (i.e. than the rest of the video content) of a video file or container for the video content. This information can be read by a computer system, holographic projection system, or the like to obtain directives about how to present the video content on the display device(s). Once a video is selected for playing, a display device (for instance) can identify the layer for holography the portions of the video frames that are pulled out of the main video layer, and the projector(s) installed at the edge of the display(s) can project the holographic content as holographic objects/images. The main or primary video layer will be presented on the display(s) so that the viewer can view both content.

Alternatively, input or streaming video content may be analyzed on-the-fly and broken into these parts described above to identify the digital object(s) for holographic projection, and present the video content including the holographic images, all in real-time. This may be useful in live event streaming or viewing where prior analysis and storing to an added layer may not be practical.

Figure 6A:
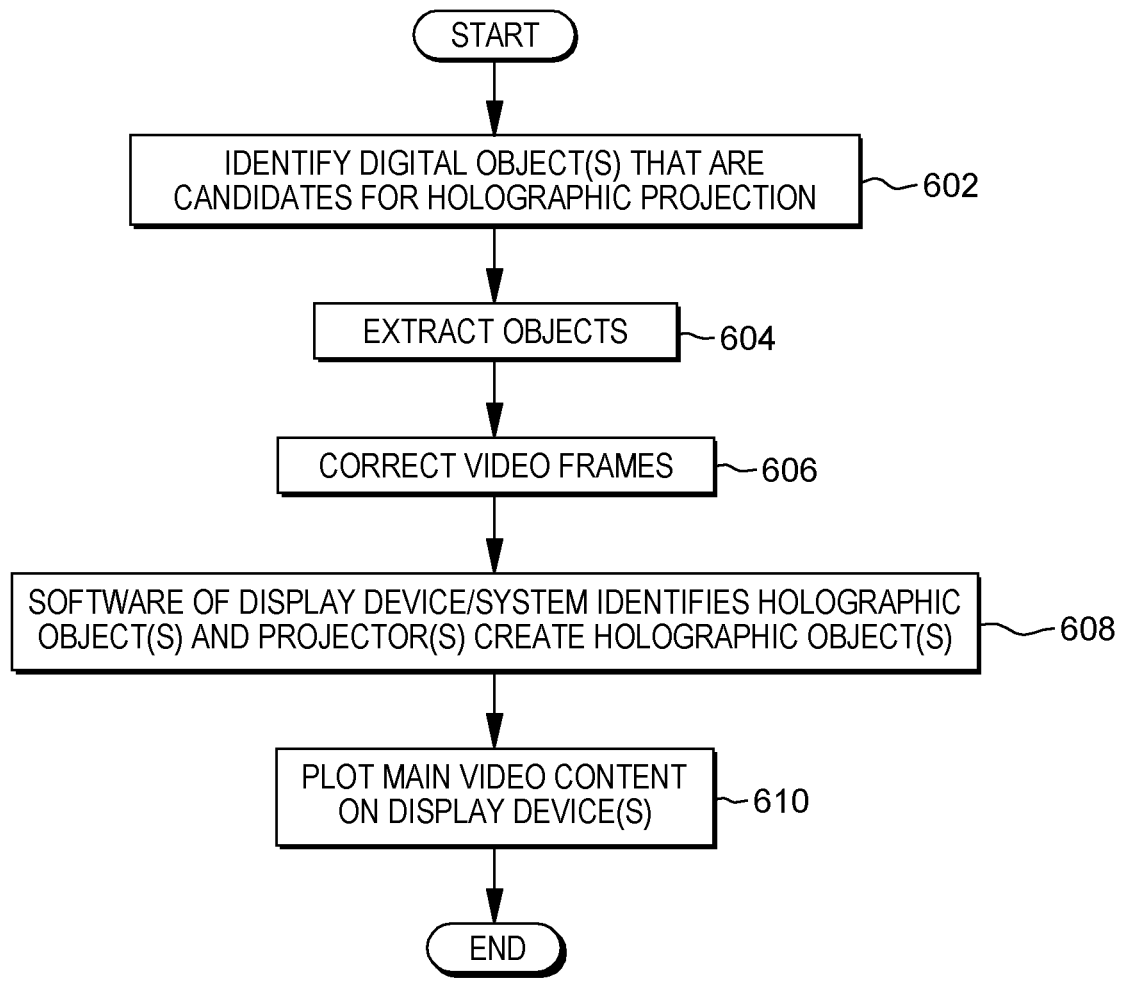
FIG. 6A depicts an example process for holographic projection of digital objects in accordance with aspects described herein.

FIG. 6A depicts an example process for holographic projection of digital objects in accordance with aspects described herein. In some examples, the process is performed one or more computer systems, such as those described herein, which may be, include or be incorporated into display device(s), or may be in communication with display device(s).

Based on video content being uploaded, provided, input, streamed, etc. to a video server or other computer system, software installed in the system can identify the digital image objects that are candidates for holographic projection (602), for instance those that are expected to be most visually appealing if presented holographically. This selection of the digital object(s) may be made from many objects that are recognized in the video content and can be based on any desired criteria. For example, it could be object(s) identified as being key, primary, or important, such as a soccer ball or tennis ball of a match, a prominent object like a car moving from one location to another, a person jumping, a fish jumping out of water, etc. Additionally or alternatively, it may be based on determining visual feedback from a user, indicative of which object(s) the viewer is viewing. If the viewer is focused on a particular digital object, it may be most appealing to the user to view that object as a holographic projection. Additionally or alternatively, the selection may be made based on metadata of the video content, indications about recommended object(s) for holographic projection, and/or information from a social network indicative of popular object(s) for holographic projection. The recommended or popular object(s) may be specific to the video content.

Video analysis software can extract the digital object(s) that are candidates for holographic projection (604). Accordingly, software can identify the impacted video frames and extract the object(s) therefrom. The extracted objects can be placed in a new layer of the video if desired, referred to the objects as holographic objects.

Using an image correction method or other method, software can 'correct' the video frames (606), inserting replacement digital content in the portions of the video frames from which the digital object(s) was/were removed. A gap created by extracting the candidate holographic object(s) is thereby filled-in. Automated and/or manual post-production video editing may be employed to create a separate layer for holographic objects/images.

When playing the video content, or if the process is performed in real-time as source video content is received, software installed in the display device(s)/system, e.g. a TV system, identifies the holographic object(s) and the projector(s) installed in/at the edge(s) of the display(s) create holographic object(s) (608). The projectors can move the holographic image(s) from one place to another place based on video frame sequence and where the digital object(s) moved between in the sequence of video frames.

Meanwhile, the main or primary video content (perhaps substituting the modified video frames in for the original unmodified video frames) may be plotted on the display device(s) in a display surface area (610) so that the user can view both the holographic and the primary video content at the same time.

Figure 6B:
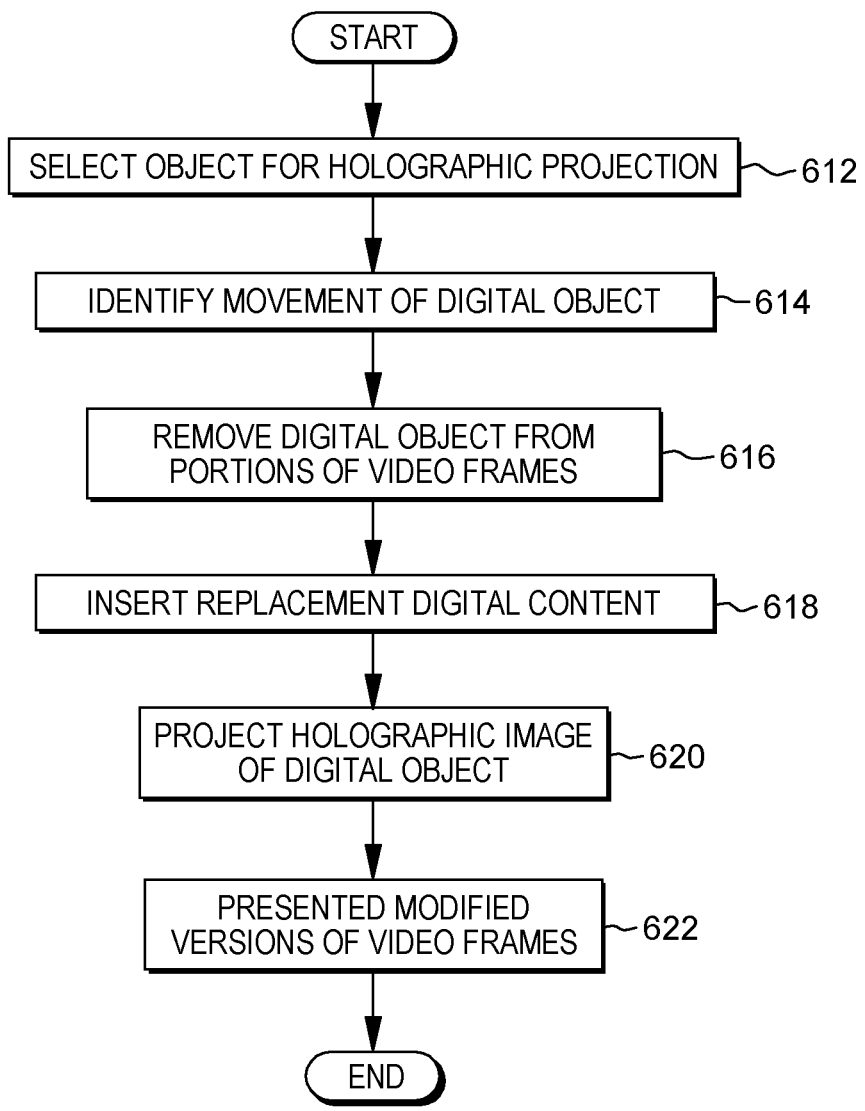
FIG. 6B depicts another example process for holographic projection of digital objects in accordance with aspects described herein.

FIG. 6B depicts another example process for holographic projection of digital objects in accordance with aspects described herein. In some examples, the process is performed one or more computer systems, such as those described herein, which may be, include or be incorporated into display device(s), or may be in communication with display device(s).

The process begins by selecting a digital object in video content for holographic projection (612). The selecting maybe from a plurality of digital objects of the video content. In some examples, the selecting is based on determining visual feedback from a user, the visual feedback indicative of which one or more objects of the digital content the user is viewing (e.g. based on input from an optical sensor tracking the user's viewing direction, as an example). Additionally or alternatively, the selecting may be based on information from a social network indicative of popular one or more digital objects for holographic projection.

The process continues by identifying movement of the digital object in the video content (614), the movement being along a path across a plurality of video frames of the video content. The process then presents the video content on at least one display device. Accordingly, the process can remove the digital object from portions of the plurality of video frames (616) and select and insert replacement digital content in the portions of the plurality of video frames (618). The removing and the inserting provides modified versions of the plurality of video frames. The selecting of the replacement digital content for insertion may be a selection from one or more other video content of a scene presented in the plurality of video frames (for instance content captured by another video camera). Additionally or alternatively, the selecting of the replacement digital content for insertion may include performing video frame analysis on the plurality of video frames and applying image correction to extrapolate the replacement digital content for insertion in the portions of the plurality of video frames.

The process continues by projecting a three-dimensional holographic image of the digital object adjacent to a surface of the display (620). The projecting traces the holographic image along the path (of the movement of the digital object) across the plurality of video frames. The identification of this movement can identify a direction of the movement of the digital object and corresponding positions of the digital object in the plurality of video frames, where the projecting positions the holographic image over the identified corresponding positions of the digital object.

In addition to projecting the holographic images, the process can also present the modified versions of the plurality of video frames (i.e. as modified to include the replacement digital content) (622) as the video content presented on the display device(s).

In some examples, the at least one display device includes a first display device and a second display device, and the presenting the video content presents the video content spanning at least the first and second display devices. The path can extend across a portion of the first display to the second display and across a portion of the second display, and the projecting the holographic image traces the holographic image across the portion of the first display to the second display and across the portion of the second display.

In some examples the at least one display device includes a curved display panel, and the digital object moves along the path from a first location of the curved display panel to a second location of the curved display panel. The projecting the holographic image can commence projection of the holographic image adjacent to the first location of the curved display panel, trace the holographic image along the path, and terminate projection of the holographic image adjacent to the second location of the curved display panel.

In some examples where there is preprocessing of a digital file storing the video content, the process can include adding a layer to a digital file storing the video content, the added layer including holography information describing the holographic image and positioning for the holographic image during video content playback.

Additionally or alternatively, the identifying the digital object and the presenting may be performed in real-time as the video content is streamed from a source.

In some embodiments, the above is performed for several digital objects of video content for simultaneous holographic projection thereof.

Although various examples are provided, variations are possible without departing from a spirit of the claimed aspects.

Figure 7:
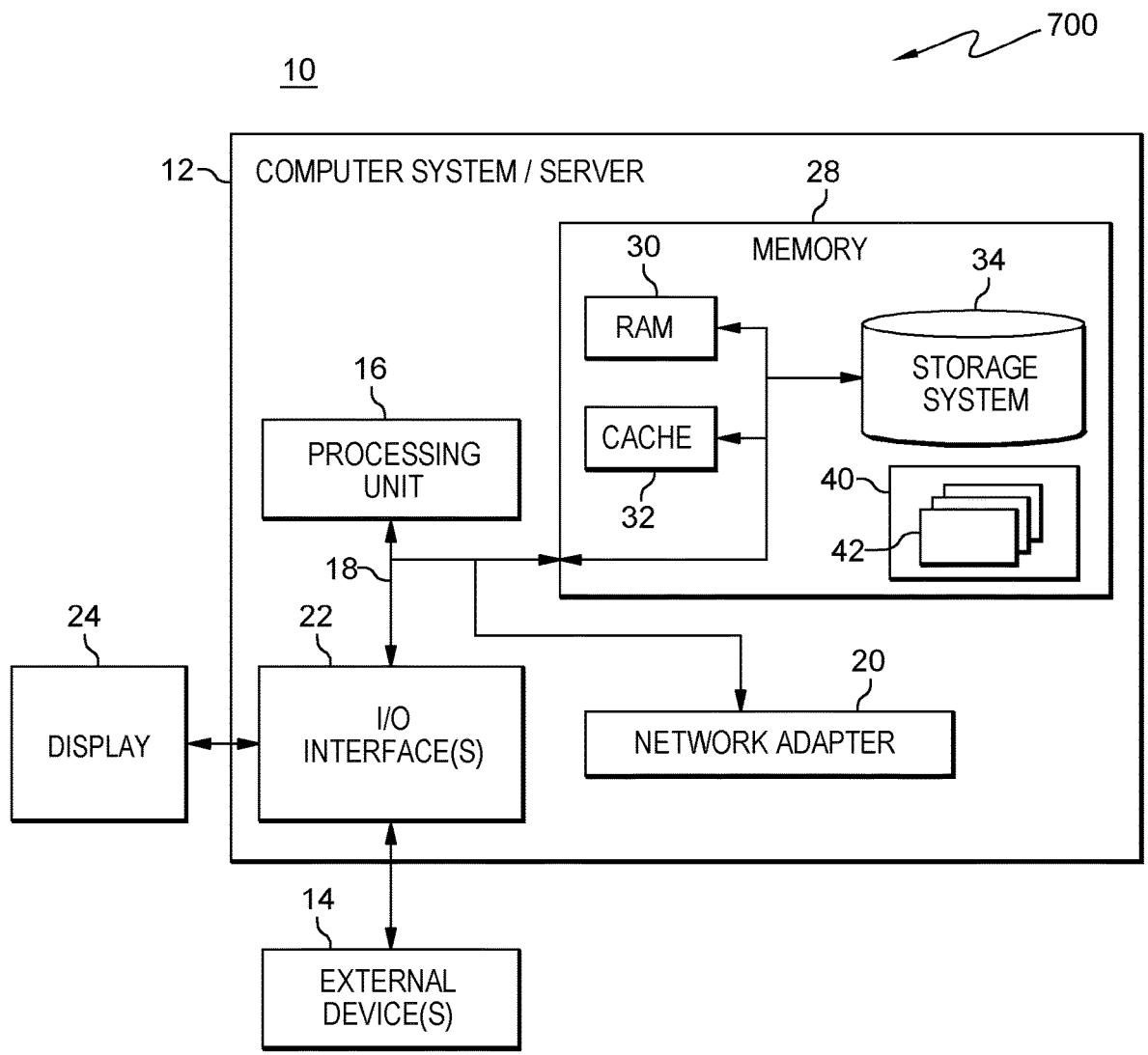
FIG. 7 depicts one example of a computer system and associated devices to incorporate and/or use aspects described herein.

Processes described herein may be performed singly or collectively by one or more computer systems, such as one or more cloud servers or backend computers, display devices, smartphones, televisions, or other computer systems, or a combination of the foregoing. FIG. 7 depicts one example of such a computer system and associated devices to incorporate and/or use aspects described herein. A computer system may also be referred to herein as a data processing device/system or computing device/system/node, or simply a computer. The computer system may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

As shown in FIG. 7, a computing environment 700 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, workstations, laptops, handheld devices, mobile devices/computers such as smartphones, tablets, and wearable devices, multiprocessor systems, microprocessor-based systems, telephony device, network appliance (such as an edge appliance), virtualization device, storage controller set top boxes, programmable consumer electronics, smart devices, intelligent home devices, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media such as erasable programmable read-only memory (EPROM or Flash memory). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more computer application programs, other program modules, and program data. Computer programs may execute to perform aspects described herein. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Input/Output (I/O) devices (including but not limited to microphones, speakers, accelerometers, gyroscopes, magnetometers, sensor devices configured to sense light, ambient temperature, levels of material), activity monitors, GPS devices, cameras, etc.) may be coupled to the system either directly or through I/O interfaces 22. Still yet, computer system/server 12 may be able to communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter(s) may also enable the computer system to become coupled to other computer systems, storage devices, or the like through intervening private or public networks. Ethernet-based (such as Wi-Fi) interfaces and Bluetooth® adapters are just examples of the currently available types of network adapters used in computer systems.

It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 7.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 8:
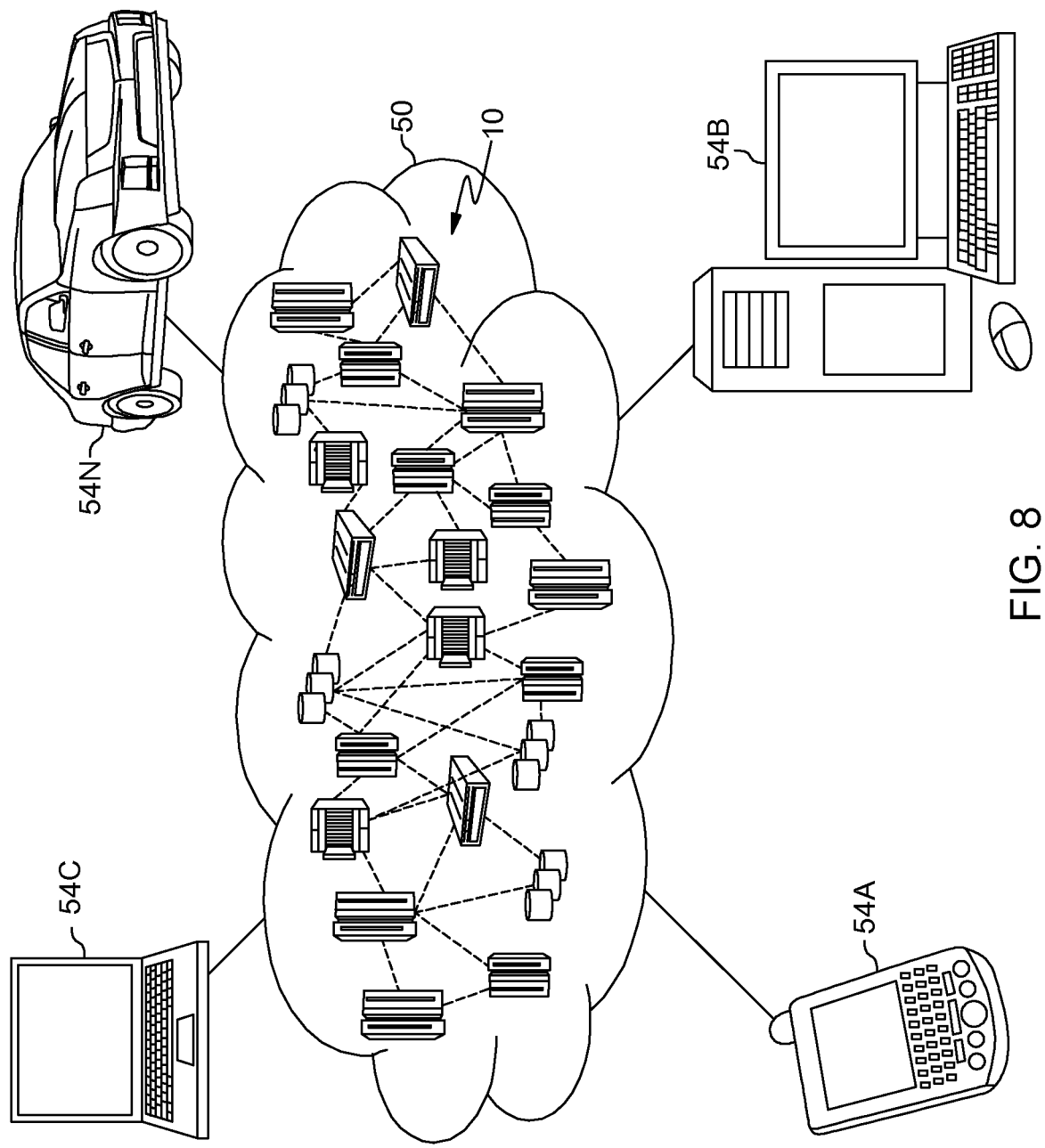
FIG. 8 depicts one embodiment of a cloud computing environment.

Referring now to FIG. 8, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
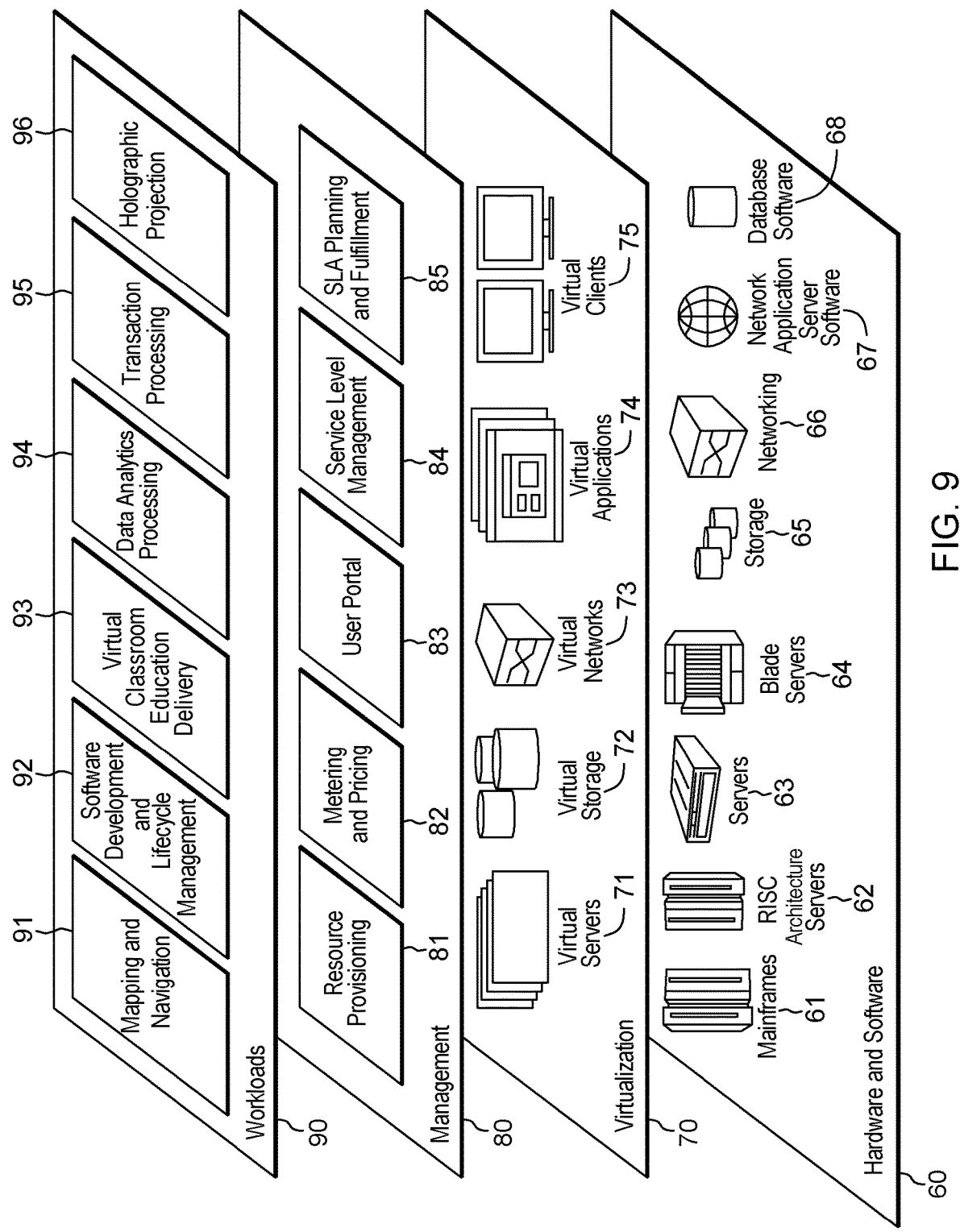
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and holographic projection 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed.

Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   identifying movement of a digital object in video content, the movement being along a path across a plurality of video frames of the video content;
   presenting the video content on at least one display device, wherein a line of sight of a user extends from the user to the at least one display device and the video content being presented thereon, wherein the presenting the video content comprises:
      removing the digital object from portions of the plurality of video frames;
      inserting replacement digital content in the portions of the plurality of video frames, the removing and inserting providing modified versions of the plurality of video frames; and
      presenting the modified versions of the plurality of video frames as the presented video content; and
   projecting a three-dimensional hologram of the digital object adjacent to, and physically spaced apart from, a surface of the at least one display device and in the line of sight of the user, between the user and the at least one display device to which the user's line of sight extends, wherein the projecting traces the hologram along the path across the plurality of video frames.

2. The method of claim 1, further comprising selecting the replacement digital content for insertion, the selecting being from one or more other video content of a scene presented in the plurality of video frames.

3. The method of claim 1, further comprising selecting the replacement digital content for insertion, the selecting comprising performing video frame analysis on the plurality of video frames, and applying image correction to extrapolate the replacement digital content for insertion in the portions of the plurality of video frames.

4. The method of claim 1, further comprising identifying a direction of the movement of the digital object and corresponding positions of the digital object in the plurality of video frames, wherein the projecting positions the hologram over the identified corresponding positions of the digital object.

5. The method of claim 1, further comprising selecting the digital object for holographic projection, the selecting being from a plurality of digital objects of the video content, wherein the selecting is based on determining visual feedback from a user, the visual feedback indicative of which one or more objects of the digital content the user is viewing.

6. The method of claim 1, further comprising selecting the digital object for holographic projection, the selecting being from a plurality of digital objects of the video content, wherein the selecting is based on information from a social network indicative of popular one or more digital objects for holographic projection.

7. The method of claim 1, wherein the at least one display device comprises a first display device and a second display device, wherein the presenting the video content presents the video content spanning at least the first and second display devices, wherein the path extends across a portion of the first display device to the second display device and across a portion of the second display device, and wherein the projecting traces the hologram across the portion of the first display device to the second display device and across the portion of the second display device.

8. The method of claim 1, wherein the at least one display device comprises a curved display panel, wherein the digital object moves along the path from a first location of the curved display panel to a second location of the curved display panel, and wherein the projecting the hologram commences projection of the hologram adjacent to the first location of the curved display panel, traces the hologram along the path, and terminates projection of the hologram adjacent to the second location of the curved display panel.

9. The method of claim 1, further comprising adding a layer to a digital file storing the video content, the added layer including holography information describing the hologram and positioning for the hologram during video content playback.

10. The method of claim 1, wherein the identifying and the presenting is performed in real-time as the video content is streamed from a source.

11. A computer system comprising:
   a memory; and
   a processor in communication with the memory, wherein the computer system is configured to perform a method comprising:
      identifying movement of a digital object in video content, the movement being along a path across a plurality of video frames of the video content;
      presenting the video content on at least one display device, wherein a line of sight of a user extends from the user to the at least one display device and the video content being presented thereon, wherein the presenting the video content comprises:
         removing the digital object from portions of the plurality of video frames;
         inserting replacement digital content in the portions of the plurality of video frames, the removing and inserting providing modified versions of the plurality of video frames; and
         presenting the modified versions of the plurality of video frames as the presented video content; and
      projecting a three-dimensional hologram of the digital object adjacent to, and physically spaced apart from, a surface of the at least one display device and in the line of sight of the user, between the user and the at least one display device to which the user's line of sight extends, wherein the projecting traces the hologram along the path across the plurality of video frames.

12. The computer system of claim 11, wherein the method further comprises selecting the digital object for holographic projection, the selecting being from a plurality of digital objects of the video content, wherein the selecting is based on determining visual feedback from a user, the visual feedback indicative of which one or more objects of the digital content the user is viewing.

13. The computer system of claim 11, wherein the method further comprises selecting the digital object for holographic projection, the selecting being from a plurality of digital objects of the video content, wherein the selecting is based on information from a social network indicative of popular one or more digital objects for holographic projection.

14. The computer system of claim 11, wherein the at least one display device comprises a first display device and a second display device, wherein the presenting the video content presents the video content spanning at least the first and second display devices, wherein the path extends across a portion of the first display device to the second display device and across a portion of the second display device, and wherein the projecting traces the hologram across the portion of the first display device to the second display device and across the portion of the second display device.

15. The computer system of claim 11, wherein the at least one display device comprises a curved display panel, wherein the digital object moves along the path from a first location of the curved display panel to a second location of the curved display panel, and wherein the projecting the hologram commences projection of the hologram adjacent to the first location of the curved display panel, traces the hologram along the path, and terminates projection of the hologram adjacent to the second location of the curved display panel.

16. A computer program product comprising:
  a computer readable storage medium readable by a processor and storing instructions for execution by the processor for performing a method comprising:
    identifying movement of a digital object in video content, the movement being along a path across a plurality of video frames of the video content;
    presenting the video content on at least one display device, wherein a line of sight of a user extends from the user to the at least one display device and the video content being presented thereon, wherein the presenting the video content comprises:
      removing the digital object from portions of the plurality of video frames;
      inserting replacement digital content in the portions of the plurality of video frames, the removing and inserting providing modified versions of the plurality of video frames; and
      presenting the modified versions of the plurality of video frames as the presented video content; and
    projecting a three-dimensional hologram of the digital object adjacent to, and physically spaced apart from, a surface of the at least one display device and in the line of sight of the user, between the user and the at least one display device to which the user's line of sight extends, wherein the projecting traces the hologram along the path across the plurality of video frames.

17. The computer program product of claim 16, wherein the method further comprises selecting the digital object for holographic projection, the selecting being from a plurality of digital objects of the video content, wherein the selecting is based on at least one selected from the group consisting of: determining visual feedback from a user, the visual feedback indicative of which one or more objects of the digital content the user is viewing, and information from a social network indicative of popular one or more digital objects for holographic projection.

* * * * *